United States Patent [19]

Bothe et al.

[11] Patent Number: 4,912,091

[45] Date of Patent: * Mar. 27, 1990

[54] NON-SEALABLE POLYPROPYLENE MULTI-LAYER FILM

[75] Inventors: Lothar Bothe, Mainz-Gonsehheim; Guenther Crass, Taunusstein; Gunter Schloegl, Kelkheim, all of Fed. Rep. of Germany

[73] Assignee: Hoechst Aktiengesellschaft, Frankfurt am Main, Fed. Rep. of Germany

[*] Notice: The portion of the term of this patent subsequent to Feb. 16, 2005 has been disclaimed.

[21] Appl. No.: 111,791

[22] Filed: Oct. 23, 1987

[30] Foreign Application Priority Data

Nov. 4, 1986 [DE] Fed. Rep. of Germany ....... 3637471

[51] Int. Cl.$^4$ .............................................. B29D 22/00
[52] U.S. Cl. .................................. 428/35.2; 428/215; 428/516; 428/910; 428/447; 428/448; 264/176.1; 156/244.11
[58] Field of Search ................. 428/35, 500, 349, 215, 428/35.2, 910, 447, 448; 156/244.11; 264/176.1

[56] References Cited

U.S. PATENT DOCUMENTS

| | | | |
|---|---|---|---|
| 4,419,411 | 12/1983 | Park | 428/516 |
| 4,578,316 | 3/1986 | Clauson et al. | 428/35 |
| 4,590,125 | 5/1986 | Balloni et al. | 428/35 |
| 4,652,489 | 3/1987 | Crass et al. | 428/35 |
| 4,720,420 | 1/1988 | Crass et al. | 428/215 |
| 4,725,466 | 2/1988 | Crass et al. | 428/35 |
| 4,734,318 | 3/1988 | Crass et al. | 428/216 |

FOREIGN PATENT DOCUMENTS 0124310 11/1984 European Pat. Off. .

*Primary Examiner*—Edith Buffalow
*Attorney, Agent, or Firm*—Foley & Lardner, Schwartz, Jeffery, Schwaab, Mack, Blumenthal & Evans

[57] ABSTRACT

An on-sealable, biaxially oriented, transparent multi-layer film is disclosed comprising a base layer, two intermediate layers separated from each other by this base layer and two covering layers, one covering layer each being arranged on top of an intermediate layer, the intermediate layers containing a combination of additives comprising a long-chain aliphatic amine and an inorganic pigment and the covering layers containing, in each case, a polydialkylsiloxane. A process for the production of the multi-layer film and its use are also disclosed.

21 Claims, No Drawings

4,912,091

NON-SEALABLE POLYPROPYLENE MULTI-LAYER FILM

BACKGROUND OF THE INVENTION

The present invention relates to a non-sealable, biaxially oriented, transparent multi-layer film. The invention also relates to a process for the production of this film and to its use.

The hitherto known non-sealable, biaxially oriented multi-layer films of propylene polymers, formed of a base layer and one or two covering layers have, in particular, the disadvantage that they are unsatisfactory in view of their slip and anti-blocking characteristics, while they simultaneously have good antistatic properties and a high transparency. In addition, the scratch resistance of these films, which is another important property, is more or less insufficient.

Many attempts have already been made to obtain polypropylene multi-layer films with improved properties by incorporating additives into the covering layers, with a view to producing the desired properties. For example, it has previously been suggested to include an effective amount of a thermoplastic resin having a melting point above the melting point of the polypropylene (incompatible thermoplastic resin) or of an inorganic pigment into the covering layers. The inorganic pigments mentioned comprise aluminum oxide, silicon dioxide, titanium dioxide, a synthetic zeolite and the like, and also micro glass beads. However, all these films are unable to meet the actual requirements.

U.S. Pat. No. 4,419,411 describes a polypropylene multi-layer film, the base layer of which comprises a polypropylene of high stereoregularity and the skin layer of which comprises a polyolefin of comparatively low stereoregularity and additionally contains a surface-modifying agent, for example, a silicate or a silicone oil. The multi-layer film is stated to have a low coefficient of friction which remains constant over a wide temperature range.

European Patent Application No. 0 138 203 teaches that, instead of adding anti-blocking and slip agents and optionally further additives as individual components to a polyolefin material, it is economical to form a combined concentrate from these components prior to the admixing operation and to add this concentrate to the polyolefin material in one batch.

In European Patent Application No. 0 124 310, a non-sealable, biaxially oriented multi-layer film of propylene polymers is described, which is stated to have good slip and anti-blocking properties and, at the same time, a high transparency. This film comprises a base layer and at least one covering layer, the covering layers containing, as an additive for the improvement of properties, a finely divided inorganic pigment, for example, silicon dioxide, aluminum silicate, sodium-aluminum silicate and/or carbon black, in an amount such that the biaxially drawn multi-layer film no longer shows any turbidity worth mentioning. The average particle size of the pigment is indicated as ranging from 0.2 to 5 μm. The shape (form) of the pigment particles is not specified; it is obviously considered inessential.

The above-described polypropylene multi-layer film lacks, in particular, sufficient antistatic properties and scratch resistance and its slip and anti-blocking values still leave much to be desired. Just as all the other presently known non-sealable, oriented multi-layer films of propylene polymers, this film cannot be subjected to a corona treatment on both surfaces, since by this treatment the anti-blocking behavior is reduced to such an extent that blocking (sticking) of the film on the film roll occurs. Frequently, such sticking of superimposed film surfaces not only gives rise to elongation and tearing of the film, but can even prevent unwinding from the roll.

As is evident from the cited art, the additives for the improvement of properties are, in each case, combined in a covering layer and/or base layer. The effects which the individual additives within a layer have upon each other are therefore not considered as being decisive for the characteristic features of the resulting film.

Moreover, sealable, biaxially oriented multi-layer films of propylene polymers formed of two or three layers have also been disclosed, which contain one or several additives in their sealing layers to obtain good slip properties and, in particular, good machine runability in high-speed packaging machines, which is the most important property. These films, which are not the subject matter of the present invention, do not only constitute a specific group, they are also intended for purposes which are completely different from those for which the non-sealable, oriented multi-layer films are used.

SUMMARY OF THE INVENTION

It is an object of the invention to provide a non-sealable, biaxially oriented multi-layer film having good slip properties.

It is another object of the invention to provide such a film having good anti-blocking properties.

It is a further object of the invention to provide such a film having good optical (i.e., very slight turbidity and a high transparency) properties.

It is yet another object of the invention to provide such a film having good antistatic properties.

It is another object of the invention to provide such a film having high scratch resistance.

It is an object of the present invention to provide a non-sealable, biaxially oriented multi-layer film in which all the above properties are combined.

It is a further object of the invention to provide such a film in which these properties remain unaffected when the film is subjected to a corona treatment, which is particularly carried out to attain an improved printability and a better adhesion of adhesives and the like.

These and other objects of the invention are achieved by providing a non-sealable, biaxially oriented, transparent multi-layer film, comprising a base layer, two intermediate layers separated from each other by this base layer, and two covering layers. The covering layers are each arranged on top of an intermediate layer, the intermediate layers containing a combination of additives comprising (a) a long-chain aliphatic amine and
(b) an inorganic pigment and the covering layers containing, in each case, a polydialkylsiloxane.

DESCRIPTION OF THE PREFERRED EMBODIMENTS

The propylene homopolymer which is used according to the present invention to substantially form the base layer, the intermediate layers, and the covering layers, preferably comprises an isotactic polypropylene. Preferred isotactic polypropylenes are those in which the n-heptane-soluble amount is not more than about 15% by weight, preferably not more than about 8% by weight (the n-heptane-soluble amount of isotactic polypropylenes is normally in the range of from about 2% to 10% by weight), the melting point is at least 150° C. (it usually ranges from 155° to 170° C) and the melt index (according to DIN 53 735) ranges from about 0.5 to 8 g/10 min., preferably from about 1.5 to 4 g/10 min., at 230° C. and under a load of 21.18N.

The melt index of the propylene homopolymer forming the intermediate layers is preferably from about 0.5 to 1 g/10 min. higher than the melt index of the polypropylene forming the base layer.

The melt index of the propylene homopolymer forming the covering layers is preferably from about 0.5 to 1 g/10 min. higher than the melt index of the polypropylene forming the intermediate layers.

As component (a) of the combination of additives which, according to the present invention, is included in the intermediate layers, tertiary aliphatic amines are preferably used which contain a particularly straight chain alkyl or alkoxy radical which has from 10 to 22 carbon atoms, preferably from 12 to 18 carbon atoms and, optionally, from one to three double bonds. The particularly preferred tertiary aliphatic amines are those which contain the above-indicated alkyl or alkoxy radical and two hydroxy-($C_2$ to $C_4$)-alkyl radicals. Preferred representatives of these are the N,N-bis-(2-hydroxy- ethyl)-alkylamines containing a $C_{10}$ to $C_{22}$, preferably a $C_{12}$ to $C_{18}$, alkyl radical and the N,N-bis-(2-hydroxy-ethyl)-alkoxyamines containing a $C_{10}$ to $C_{22}$, preferably a $C_{12}$ to $C_{18}$, alkoxy radical or corresponding mixtures. The amount of component (a) ranges from about 0.2% to 1.5% by weight, preferably from about 0.5% to 1.0% by weight, based on the layer.

Component (b) of the combination of additives which, according to the present invention, is used for the intermediate layers comprises an inorganic pigment. Suitable inorganic pigments are, for example, aluminum silicates, calcium carbonate and silicon dioxide. Preference is given to aluminum silicates which may also contain alkali metals and/or alkaline earth metals. The index of refraction of the pigment is in the range from about 1.4 to 1.6. The aspect ratio, which refers to the ratio of surface to thickness of the particles (value of particle geometry), is lower than about 8, preferably lower than 4. The average particle size ranges from about 0.2 to 4 $\mu$m, preferably from about 0.2 to 1 $\mu$m, the largest particle having a diameter below 25 $\mu$m. The amount of component (b), based on the weight of the intermediate layer, ranges from about 0.1% to 1% by weight, preferably from about 0.2% to 0.6% by weight.

The additive component contained in the covering layers comprises a polydialkylsiloxane. A polydi-($C_1$-$C_4$)-alkylsiloxane is preferably used, polydimethylsiloxane being particularly preferred. The polydialkylsiloxane has a viscosity in the range from about 1,000 to 100,000 mm$^2$/s, preferably from about 5,000 to 50,000 mm$^2$/s, at 25° C. The amount of polydialkylsiloxane ranges from about 0.2% to 1% by weight, preferably from about 0.3% to 0.7% by weight, based on the weight of the covering layer.

Both the intermediate layers and the covering layers, in each case, may have the same composition or different compositions. In a particularly preferred embodiment, however, the two intermediate layers and also the two covering layers have the same composition.

The thickness of the multi-layer film of the present invention may vary within wide limits and depends, in particular, on the intended use. The film is from about 8 to 50 $\mu$m, preferably from about 12 to 40 $\mu$m, thick (total thickness), the thickness of one intermediate layer ranging from about 0.5 to 2 $\mu$m and the thickness of one covering layer from about 0.1 to 2 $\mu$m, preferably from about 0.5 to 1 $\mu$m.

The multi-layer film of the present invention is biaxially oriented (stretch oriented), the longitudinal stretch ratio preferably being from about 4:1 to 7:1 and the transverse stretch ratio preferably from about 7:1 to 10:1.

For the production of the multi-layer films of propylene polymers according to the present invention, any of the processes known per se may be used. As is known, the mixtures (molding compounds) corresponding to the layers are first prepared by mixing the individual components in a mixer. It goes without saying that, in the preparation of the mixtures containing the combination of additives, the individual additives are properly blended (incorporated) into the propylene homopolymer, such that they are present in a uniformly distributed form. The multi-layer films may be produced by coextrusion, followed by stretch orientation; by subsequent coating of a stretch oriented film (base film), or by coating an unoriented film, followed by stretch orientation.

The multi-layer film of the invention is preferably produced according to the coextrusion process. In this process, the melts corresponding to the layers of the film are coextruded through a flat sheet die, the coextruded film is cooled and thereby solidified, the solidified film is biaxially stretch oriented, preferably four to sevenfold in the longitudinal direction and preferably seven to tenfold in the transverse direction, and the biaxially stretch oriented film is heat set. First of all, the polymers (the mixtures) corresponding to the base layer and to the covering layer or covering layers, are plastified and compressed in extruders. Then the melts are simultaneously extruded through a flat sheet die (slot die) and the extruded multi-layer film is cooled and solidified on one or several rolls maintained at a temperature of from about 30° C. to 50° C. by cooling. The film thus obtained is longitudinally stretched at a temperature which is below the melting point of the polymer used. Longitudinal stretching is preferably carried out at a film temperature of from about 120° C. to 140° C. Transverse stretching is preferably carried out at a stretch temperature of from about 160° C. to 180° C. Biaxial stretching can be carried out simultaneously or successively, it is preferably performed successively, namely first longitudinally and then transversely. Longitudinal stretching is appropriately carried out with the aid of two rolls rotating at different speeds corresponding to the desired stretching ratio and transverse stretching with the aid of an appropriate clip tenter. For heat-setting (post heating) the film is kept at a temperature of from about 150° C. to 160° C. for about 0.5 to 10 seconds.

The non-sealable, biaxially stretch oriented, transparent multi-layer film of the present invention may be subjected to a corona treatment to render it, in particular, readily printable and coatable, for example with adhesives. It is an unexpected result that the film according to the present invention containing the specified combination of additives in its covering layers, can be subjected to a corona treatment, without thereby adversely influencing any of its desirable properties, although it has been pointed out in the literature and confirmed by experiments of the applicants that the slip and anti-blocking behavior of polypropylene films is considerably impaired by a corona treatment.

The procedure followed in the corona treatment of the film, which can be carried out according to any of the known methods and can be performed on one or both sides of the film, appropriately comprises passing the film between two conductor elements serving as the electrodes, while a voltage, usually an alternating voltage (about 10,000 V and 10,000 cps) which is high enough to effect spray or corona discharges, is applied between the electrodes. By the corona treatment, a surface tension of about 38 mN/m is produced.

The non-sealable, biaxially oriented, transparent multi-layer film of a propylene homopolymer according to the present invention has many uses, due to its excellent characteristic features including the possibility of carrying out a corona treatment without impairing these characteristic features. The film of the present invention is preferably used as a film for the production of bags, a laminating film, an interleaving film, a transfer metallizing film or as a support film for adhesive tapes.

The following examples serve to illustrate the invention in detail, without limiting its scope.

EXAMPLES AND COMPARATIVE EXAMPLES

According to the coextrusion process, 1 mm thick films formed of one, three or five layers were, in each case, extruded through a slot die having a width of 280 mm and a gap height of 1.8 mm, at an extrusion temperature of 260° C. and a throughput of 70 kg/h. The base layer comprised, in each case, an isotactic polypropylene with an n-heptane-soluble amount of 4.5% by weight, a melting point of 165° C. and a melt flow index of 2 g/10 min at 230° C. and under a load of 21.18N (DIN 53 735). The intermediate layers and covering layers, on the other hand, had different compositions, in each case. After travelling through a 20 mm long air gap, the coextruded films were chilled on a chill roll at a temperature of 30° C., which had a diameter of 600 mm (circumferential speed 4.5 m/min). Thereafter, the films were passed from the chill roll to a three-high roll arrangement which also had a temperature of 30° C. (circumferential speed 4.5 m/min) and, after heating to 130° C., were longitudinally stretched by a factor of 5 by a further three-high roll arrangement. They were then stretched tenfold in the transverse direction at 175° C. Heat setting was carried out at 160° C., for a duration of 5 seconds and was optionally followed by a corona treatment on one or both sides of the films.

EXAMPLE 1

The film exhibited a so-called ABCBA arrrangement, i.e., the two covering layers (A) and the two intermediate layers (B) were identical, in each case, but differed in composition from the base layer (C) and from each other. The base layer (C) was formed of an isotactic polypropylene, as indicated above, and the intermediate layers (B) were comprised of an isotactic polypropylene with an n-heptane-soluble amount of 4.5% by weight, a melting point of 165° C. and a melt flow index of 3 g/10 min, as the main constituent. They additionally contained 0.6% by weight of N,N-bis(2-hydroxyethyl)-$C_{12}$ to $C_{18}$-alkylamine and 0.3% by weight of an aluminum silicate having an aspect ratio of 6. The average particle size (the average particle diameter) was 0.55 μm, the upper limit of the particle size was 10 μm. The index of refraction measured was 1.56. The covering layers (A) were comprised of an isotactic polypropylene with an n-heptane-soluble amount of 4.5% by weight, a melting point of 165° C. and a melt flow index of 4 g/10 min. They additionally contained 0.6% by weight of a polydimethylsiloxane having a viscosity of 30,000 mm$^2$/s at 25° C.

EXAMPLE 2

This example corresponds to Example 1 with the exception that the amount of aluminum silicate contained in the intermediate layers wa 0.6% by weight.

EXAMPLE 3

This example corresponds to Example 1, except that the intermediate layers contained 0.3% by weight of a calcium carbonate, instead of the aluminum silicate. The average diameter of the $CaCO_3$ particles was 1.1 μm, the upper limit was 7 μm, the aspect ratio was 1 and the index of refraction 1.59.

EXAMPLE 4

This example also corresponds to Example 1, but in this case the intermediate layers contained 0.6% by weight of calcium carbonate as an anti-blocking agent.

All films prepared by way of example had a total thickness of 20 μm. The thickness of the intermediate layers was about 1 μm. Each covering layer had a thickness of about 0.5 μm. Using the films described in Examples 1 to 4, one sample each without corona treatment, one sample which had been corona-treated on one side, and one sample which had been coronatreated on both sides were prepared. The electrical voltages applied in the corona treatment were of such an order that a surface tension of about 38 mN/m was obtained in each case.

COMPARATIVE EXAMPLE 1

The film of this comparative example comprised only one layer which corresponded to the base layer described in Example 1. The total thickness of the film was 20 μm. One sample without corona treatment, one which had been corona-treated on one side and one which had been corona-treated on both sides were prepared. The surface tensions attained were 38 mN/m in each case.

COMPARATIVE EXAMPLE 2

The film of this comparative example also comprised only one layer which corresponded to the base layer described in Example 1. Other than in Comparative Example 1, however, the layer contained additives, namely 0.3% by weight of the aluminum silicate mentioned (compare Example 2), 0.2% by weight of stearic amide and 0.2% by weight of the $C_{12}$ to $C_{18}$ alkylamine mentioned in Example 2 (percentages by weight relating to the layer). From the film of Comparative Example 2, one sample without corona treatment, one which had been coronatreated on one side and one which had been corona treated on both sides were prepared. The surface tensions obtained were 38 mN/m in each case.

COMPARATIVE EXAMPLE 3

The film was comprised of a base layer (C) and two covering layers which corresponded in composition to the intermediate layers (B) described in Example 1. The base layer (C) corresponded to the base layer of Example 1, but it contained as additives 0.2% by weight of stearic amide and 0.2% by weight of the $C_{12}$ to $C_{18}$ alkylamine mentioned (compare Example 1). One sample without corona treatment, one which had been corona-treated on one side and one which had been corona-treated on both sides were also prepared from the film of this comparative example. The surface tensions obtained were 38 mN/m in each case.

COMPARATIVE EXAMPLE 4

The film corresponded in construction to the film of Comparative Example 3. The base layer (C) was identical to the base layer of Example 1. The covering layers corresponded to the covering layers of Comparative Example 3. The film of this comparative example was also used to prepare one sample without corona treatment, one which had been corona-treated on one side and one which had been corona-treated on both sides. The surface tension was 38 mN/m in each case.

The films of the examples and comparative examples were used to determine the anti-blocking properties, slip properties, optical properties (gloss and turbidity), antistatic properties, scratch resistance, and abrasion resistance.

The slip properties were determined according to DIN 53 375.

Gloss was determined according to DIN 67 530, using a type RB reflectometer of Messrs. Dr. Lange (Federal Republic of Germany).

The turbidity was determined according to ASTM-D 1003-52, using a 1° slit stop instead of a 4° aperture stop and measuring the turbidity on four superimposed film layers (four layers were chosen since, in this manner, the optimum measuring range of the apparatus was utilized).

The antistatic properties were determined by an ash test. For this purpose, the film was statically charged by rubbing three times in one direction with a woollen cloth. The test result is considered negative, if cigarette ash is attracted by the charged film from a distance of about 3 cm.

The scratch resistance of a film is the resistance of the film surface to alterations resulting from mechanical load. The formation of linear damage (scratches), is the result of a frictional load. The formation of worn places having the shape of depressions, is the result of an impact load.

As a measure of the scratch resistance of a film, the increase in turbidity T caused by scratching is normally used:

$$\Delta T = T_v - T_o$$

wherein $T_v$ is the turbidity of the scratched film and $T_o$ is the turbidity of the unchanged original film, the turbidity being determined, in each case, on a single film layer when measuring the scratch resistance.

The scratch resistance to frictional load was determined according to DIN 53 754. Measurements were carried out with an abrasion tester type 1161 of Messrs. Frank (Federal Republic of Germany) using CALIBRASE® CS-10F abrading discs of Messrs. Teledyne (U.S.A.), loaded at 250 g.

The scratch resistance to impact load was determined according to the sand running process. In the sand running process, 1 kg of carborundum (SiC) of grain size 0.8 mm is allowed to run through a downpipe from a height of 635 mm onto the film surface which forms an angle of 45° with the direction of fall of the grains.

TABLE

| Example | Anti-blocking Behavior | Slip Behavior | Optical Properties | Anti-static Properties | Scratch Resistance Frictional Load | Impact Load |
|---|---|---|---|---|---|---|
| 1 | ++ | ++ | ++ | ++ | ++ | ++ |
| 1T | ++ | ++ | ++ | ++ | ++ | ++ |
| 1TT | ++ | ++ | ++ | ++ | ++ | ++ |
| 2 | ++ | ++ | ++ | ++ | ++ | ++ |
| 2T | ++ | ++ | ++ | ++ | ++ | ++ |
| 2TT | ++ | ++ | ++ | ++ | ++ | ++ |
| 3 | ++ | ++ | ++ | ++ | ++ | ++ |
| 3T | ++ | ++ | ++ | ++ | ++ | ++ |
| 3TT | ++ | ++ | ++ | ++ | ++ | ++ |
| 4 | ++ | ++ | ++ | ++ | ++ | ++ |
| 4T | ++ | ++ | ++ | ++ | ++ | ++ |
| 4TT | ++ | ++ | ++ | ++ | ++ | ++ |
| Comparative Example | | | | | | |
| 1 | -- | -- | ++ | -- | -- | ++ |
| 1T | -- | -- | ++ | -- | -- | ++ |
| 1TT | -- | -- | ++ | -- | -- | ++ |
| 2 | ++ | +- | -- | ++ | +- | +- |
| 2T | ++ | +- | -- | ++ | +- | +- |
| 2TT | -- | +- | -- | ++ | +- | +- |
| 3 | ++ | +- | +- | +- | +- | +- |
| 3T | ++ | +- | +- | +- | +- | +- |
| 3TT | -- | +- | +- | +- | +- | +- |
| 4 | ++ | +- | ++ | -- | +- | +- |
| 4T | ++ | +- | ++ | -- | +- | +- |
| 4TT | -- | +- | ++ | -- | +- | +- |

++ very good
+- moderate
-- poor
T = treated on one side; TT = treated on both sides

What is claimed is:

1. A non-sealable, biaxially oriented, transparent multi-layer polymer film comprising:
    a base layer;
    an intermediate layer on each side of the base layer comprising a long-chain aliphatic amine and an inorganic pigment; and
    a covering layer on each intermediate layer comprising a polydialkylsiloxane.

2. A multi-layer film as claimed in claim 1, which is corona-treated on one side.

3. A multi-layer film as claimed in claim 1, which is corona-treated on both sides.

4. A multi-layer film as claimed in claim 1, wherein each of the layers comprises a propylene homopolymer.

5. A multi-layer film as claimed in claim 4, wherein the polypropylene homopolymer comprises an isotactic polypropylene with an n-heptane-soluble amount of not more than about 15% by weight, a melting point of at least 150° C. and a melt index in the range from about 0.5 g to 8 g/10 min at 230° C. and under a load of 21.18N.

6. A multi-layer film as claimed in claim 1, wherein the long-chain aliphatic amine comprises an N,N-bis-(hydroxy-$C_2$ to $C_4$-alkyl)-$C_{12}$ to $C_{18}$-alkylamine or an N,N-bis(hydroxy-$C_2$ to $C_4$-alkyl)$C_{12}$ to $C_{18}$-alkoxyamine or a mixture of these.

7. A multi-layer film as claimed in claim 5, wherein the intermediate layers contain the aliphatic amine in a concentration ranging from about 0.2% to 1.5% by weight, based on the weight of the intermediate layer.

8. A multi-layer film as claimed in claim 1, wherein the inorganic pigment has an index of refraction in the range from about 1.4 to 1.6, an aspect ratio of less than about 8 and an average particle size from 0.2 to 4 $\mu$m.

9. A multi-layer film as claimed in claim 8, wherein the intermediate layers contain the inorganic pigment in a concentration ranging from about 0.1% to 1.0% by weight, based on the weight of the intermediate layer.

10. A multi-layer film as claimed in claim 9, wherein the inorganic pigment comprises aluminum silicates, calcium-carbonate and/or silicon dioxide.

11. A multi-layer film as claimed in claim 1, wherein the polydialkylsiloxane of the covering layers has a viscosity at 25° C. of from about 1,000 up to several 100,000 $mm^2/s$ and is contained in the covering layers in a concentration ranging from about 0.2% to 1% by weight, based on the weight of the covering layer.

12. A multi-layer film as claimed in claim 1, wherein the film has a total thickness ranging from about 8 to 50 $\mu$m, each intermediate layer has a thickness ranging from about 0.5 to 2 $\mu$m and each covering layer has a thickness ranging from about 0.1 to 2 $\mu$m.

13. A laminating film comprising the multilayer film of claim 1.

14. A transfer metallizing film comprising the multi-layer film of claim 1.

15. A support film for adhesive tapes comprising the multi-layer film of claim 1.

16. A bag comprising the multi-layer film of claim 1.

17. An interleaving film comprising the multi-layer film of claim 1.

18. A coextrusion process for the production of the multi-layer film comprising the steps of:
coextruding melts corresponding to the layers according to claim 1;
cooling the coextruded layers to solidify the film;
biaxially stretch orienting the film; and
heat setting the stretch oriented film.

19. A multi-layer film as claimed in claim 1, wherein the intermediate layers consist essentially of a long-chain aliphatic amine and an inorganic pigment.

20. A multi-layer film as claimed in claim 19, wherein the covering layers consist essentially of a polydialkylsiloxane.

21. A non-sealable, biaxially oriented, transparent multi-layer polymer film consisting essentially of:
a base layer;
an intermediate layer on each side of the base layer comprising a long-chain aliphatic amine and an inorganic pigment; and
a covering layer on each intermediate layer comprising a polydialkylsiloxane.

* * * * *